(12) United States Patent
Kleidosty

(10) Patent No.: US 10,012,410 B2
(45) Date of Patent: Jul. 3, 2018

(54) SOUND DAMPENING APPARATUS FOR HVAC AIR FILTERS AND METHODS OF USE

(71) Applicant: SHUSH IT, INC., Sparks, NV (US)

(72) Inventor: Robert E. Kleidosty, Sparks, NV (US)

(73) Assignee: SHUSH IT, INC., Sparks, NV (US)

( * ) Notice: Subject to any disclaimer, the term of this patent is extended or adjusted under 35 U.S.C. 154(b) by 73 days.

(21) Appl. No.: 15/193,295

(22) Filed: Jun. 27, 2016

(65) Prior Publication Data

US 2017/0370613 A1    Dec. 28, 2017

(51) Int. Cl.
| | | |
|---|---|---|
| *B01D 46/10* | (2006.01) | |
| *B01D 46/52* | (2006.01) | |
| *F24F 13/28* | (2006.01) | |
| *B01D 46/42* | (2006.01) | |

(52) U.S. Cl.
CPC .......... *F24F 13/28* (2013.01); *B01D 46/4236* (2013.01)

(58) Field of Classification Search
CPC ............ B01D 46/0005; B01D 46/0075; B01D 46/10; B01D 46/52; B01D 46/521; B01D 2271/022; B01D 2279/55; B01H 1/0854
USPC .............. 55/304, 497, 502–509, 521; 96/380
See application file for complete search history.

(56) References Cited

U.S. PATENT DOCUMENTS

| | | | |
|---|---|---|---|
| 2,140,002 A | 12/1935 | Dion | |
| 3,042,959 A | 3/1958 | Strom | |
| 3,468,105 A * | 9/1969 | Cline | F24F 1/027 49/386 |
| 3,898,063 A * | 8/1975 | Gazan | B01D 35/02 181/231 |
| 4,347,912 A * | 9/1982 | Flocke | E04B 1/8409 181/286 |
| 4,787,923 A * | 11/1988 | Fleigle | A47L 9/20 55/304 |
| 4,887,399 A | 12/1989 | Berger et al. | |
| 6,511,522 B1 | 1/2003 | Gomez et al. | |
| 6,553,617 B1 | 4/2003 | Salice | |
| 7,032,271 B2 | 4/2006 | Lin | |
| 7,657,970 B2 | 2/2010 | Artsiely | |
| 2007/0137490 A1* | 6/2007 | Sisk | B01D 46/0004 96/380 |

(Continued)

FOREIGN PATENT DOCUMENTS

CN        1782565 A     6/2006

*Primary Examiner* — Robert A Hopkins
*Assistant Examiner* — Minh-Chau Pham
(74) *Attorney, Agent, or Firm* — David Duckworth

(57) ABSTRACT

A sound dampening apparatus and associated methods of use are disclosed for dampening or otherwise preventing impact noises between an HVAC air filter and a cavity of an air duct in which the air filter is positioned. In at least one embodiment, the apparatus provides a base portion engagable with a lower end of the cavity. An opposing support portion of the apparatus is configured for selectively contacting a lower face of the air filter and supporting the air filter thereon. An at least one selectively compressible spring member extends between and interconnects the base portion and the support portion. Thus, with the air filter positioned between the support portion and an upper end of the cavity, and air flowing through the cavity in a substantially upward direction, the support portion prevents the air filter from impacting the lower end of the cavity upon cessation of said air flow.

14 Claims, 3 Drawing Sheets

(56) References Cited

U.S. PATENT DOCUMENTS

2009/0065290 A1\* 3/2009 Kim ..................... E04B 1/86
181/141

\* cited by examiner

SOUND DAMPENING APPARATUS FOR HVAC AIR FILTERS AND METHODS OF USE

RELATED APPLICATIONS

Not applicable.

BACKGROUND

The subject of this patent application relates generally to heating, ventilation and air-conditioning ("HVAC"), and more particularly to a sound dampening apparatus and associated methods of use for dampening or otherwise preventing impact noises between an HVAC air filter and the air duct cavity in which the air filter is positioned.

Applicant(s) hereby incorporate herein by reference any and all patents and published patent applications cited or referred to in this application.

By way of background, HVAC system air ducts are often constructed out of metal and typically provide a cavity adjacent to each metal air vent, with each such cavity being sized and configured for receiving an air filter. Since air filters are manufactured in a variety of sizes, it is common for a given air filter to be relatively smaller than the cavity in which it is positioned. Furthermore, when such an air filter is positioned within a relatively larger cavity of a substantially vertically facing air vent (such as a ceiling vent or floor vent), the air flowing through the air duct (and the subsequent cessation of such air flow) tends to cause the air filter to move around within the cavity. Furthermore, when the air flow is substantially upwardly directed—whether air is being drawn into a ceiling vent or expelled from a floor vent—such air flow may cause the air filter to elevate toward an upper end of the cavity; such that when the air flow ceases, gravity causes the air filter to drop back down, impacting the lower end of the cavity and creating a loud metal bang. Thus, there is a need for an apparatus capable of dampening or otherwise preventing such impact noises between an air filter and the air duct cavity in which it is positioned.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a sound dampening apparatus and associated methods of use for dampening or otherwise preventing impact noises between an HVAC air filter and a cavity of an air duct in which the air filter is positioned, the cavity defined by perimeter side walls extending between a base wall and an opposing air vent. In at least one embodiment, the apparatus provides a base portion engagable with a lower end of the cavity. An opposing support portion of the apparatus is configured for selectively contacting a lower face of the air filter and supporting the air filter thereon. An at least one selectively compressible spring member extends between and interconnects the base portion and the support portion. Thus, with the air filter positioned between the support portion and an upper end of the cavity, and air flowing through the cavity in a substantially upward direction, the support portion prevents the air filter from impacting the lower end of the cavity upon cessation of said air flow, thereby dampening or otherwise preventing the air filter from creating any impact noises Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
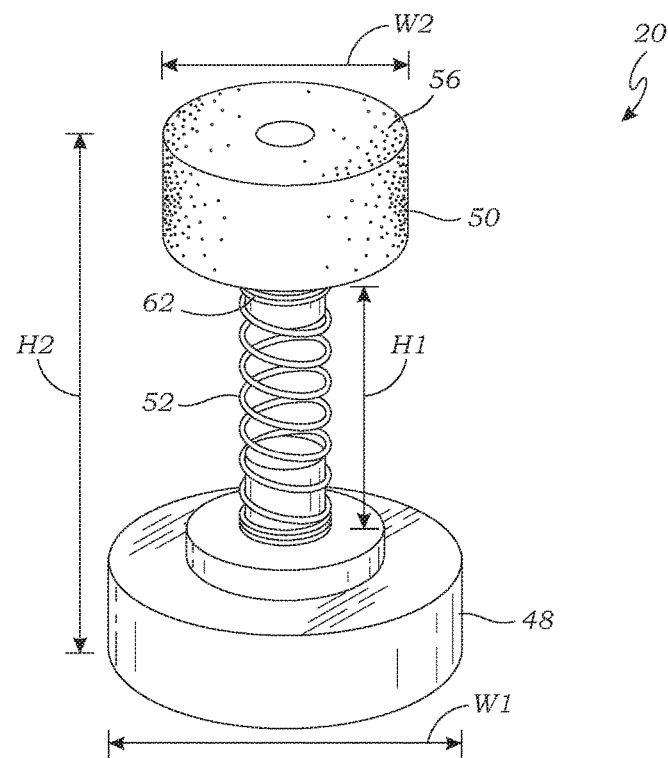
FIG. 1 is a perspective view of an exemplary sound dampening apparatus for HVAC air filters, in accordance with at least one embodiment.
Figure 5:
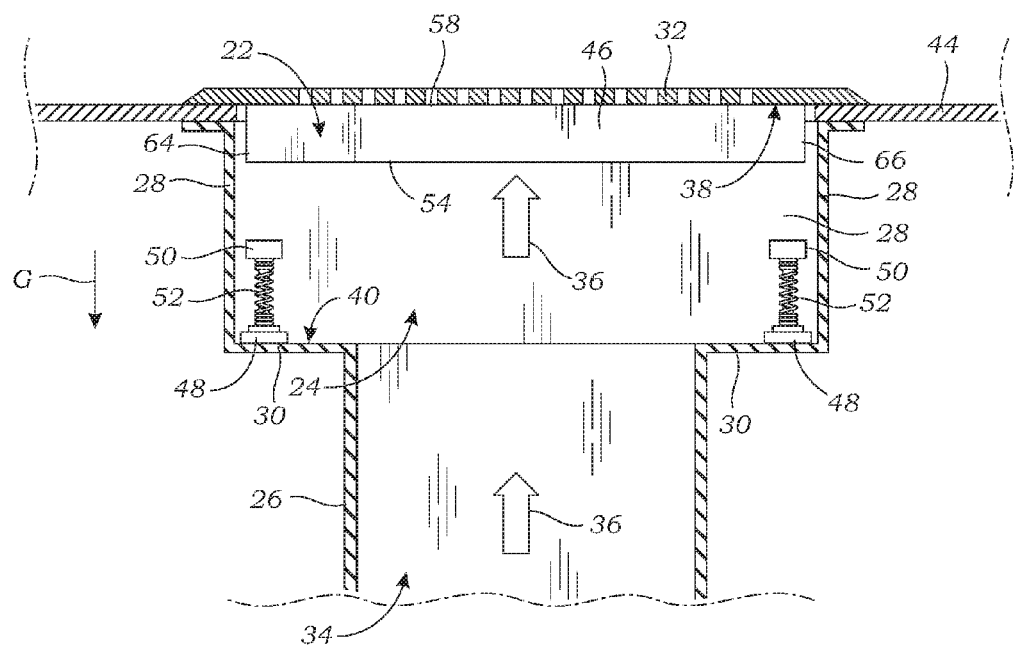
Figure 6:
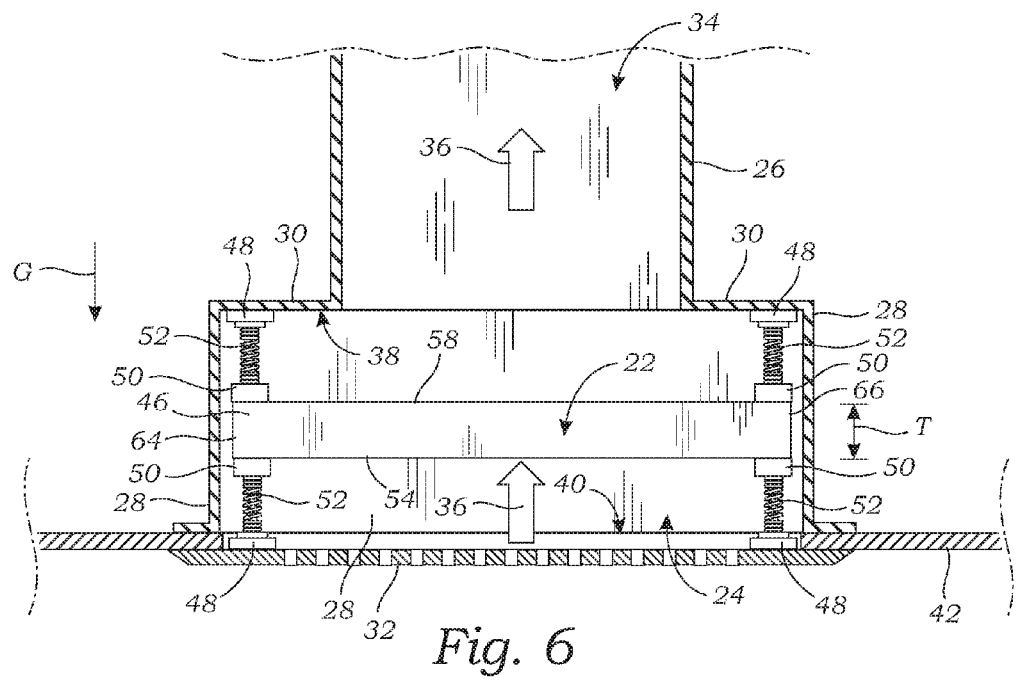

Turning now to FIG. 1, there is shown a perspective view of an exemplary embodiment of a sound dampening apparatus 20 for dampening or otherwise preventing impact noises between an HVAC air filter 22 and a cavity 24 of an air duct 26 in which the air filter 22 is positioned. In at least one embodiment, as illustrated in simplified schematic views of FIGS. 2-6, the cavity 24 is defined by perimeter side walls 28 extending between a base wall 30 and an opposing air vent 32, with the base wall 30 providing an air passage 34 in fluid communication with the air duct 26, allowing air 36 to flow therethrough. An upper end 38 and an opposing lower end 40 of the cavity 24 are dictated by the orientation of the cavity 24 relative to the direction of gravity G. Thus, where the air vent 32 of the cavity 24 is substantially downwardly directed (such as is the case where the air vent 32 is positioned within a ceiling 42 for example, as illustrated in FIGS. 2-4 and 6), the upper end 38 is the base wall 30 of the cavity 24 while the lower end 40 is the air vent 32; and where the air vent 32 of the cavity 24 is substantially upwardly directed (such as is the case where the air vent 32 is positioned within a floor 44 for example, as illustrated in FIG. 5), the upper end 38 is the air vent 32 while the lower end 40 is the base wall 30 of the cavity 24. Thus, the terms upper end 38 and lower end 40 are intended to be relative terms based on the orientation of the cavity 24 in a given embodiment. It should also be noted that while the apparatus 20 is discussed primarily in the context of substantially vertically directed air vents 32, the apparatus 20 should not be read as being so limited. In further embodiments, the apparatus 20 may be utilized in connection with any other type of air vent 32—regardless of orientation—now known or later developed, where there is a desire to dampen or otherwise prevent impact noises between the air filter 22 and the cavity 24 in which the air filter 22 is positioned. Additionally, in at least one embodiment, the air filter 22 provides a filter medium (not shown) and a filter frame 46 extending about a perimeter of the filter medium.

With continued referenced to FIG. 1, in at least one embodiment, the apparatus 20 is selectively positionable within the cavity 24 and provides a base portion 48 and an opposing support portion 50 interconnected by an at least one spring member 52. The base portion 48 is engagable with the lower end 40 of the cavity 24, while the support portion 50 is configured for selectively contacting a lower face 54 of the air filter 22, as discussed further below. In at least one embodiment, the base portion 48 is removably engagable with the lower end 40 of the cavity 24. In at least one such embodiment, where the lower end 40—i.e., the base wall 30 or the air vent 32, depending on the orientation of the cavity 24—is constructed out of metal, the base portion 48 is magnetic, thereby eliminating the need for additional fasteners. However, in further embodiments, the base portion 48 may utilize any other non-permanent or semi-permanent fasteners now known or later developed—such as temporary adhesives, hook-and-loop fasteners or screws, for example—in order to achieve a removable engagement with the lower end 40 of the cavity 24. In at least one alternate embodiment, the base portion 48 is permanently secured to the lower end 40 of the cavity 24 using permanent adhesives, welds, bolts or any other permanent fastener now known or later developed. It should be noted that the particular size, shape and dimensions of the base portion 48, as illustrated in the accompanying drawings, is merely exemplary. As such, in further embodiments, the size, shape, and dimensions of the base portion 48 may vary, so long as the apparatus 20 is substantially capable of carrying out the functionality described herein.

With continued reference to FIG. 1, in at least one embodiment, the support portion 50 is constructed out of a material (or combination of materials) capable of softening any impacts—or otherwise dampening the noise created by any impacts—received from the filter frame 46 of the air filter 22. Accordingly, in at least one such embodiment, the support portion 50 is constructed out of plastic or acrylic. In at least one further embodiment, the support portion 50 is constructed out of rubber, silicone, foam or similar resilient materials. In still further embodiments, a top surface 56 of the support portion 50 provides a pad (not shown) positioned and configured for selectively contacting the lower face 54 of the air filter 22—the pad itself constructed out of a material (or combination of materials) capable of softening any impacts—or otherwise dampening the noise created by any impacts—received from the filter frame 46 of the air filter 22. It should be noted that the particular size, shape and dimensions of the support portion 50, as illustrated in the accompanying drawings, is merely exemplary. As such, in further embodiments, the size, shape, and dimensions of the support portion 50 may vary, so long as the apparatus 20 is substantially capable of carrying out the functionality described herein.

Figure 2:
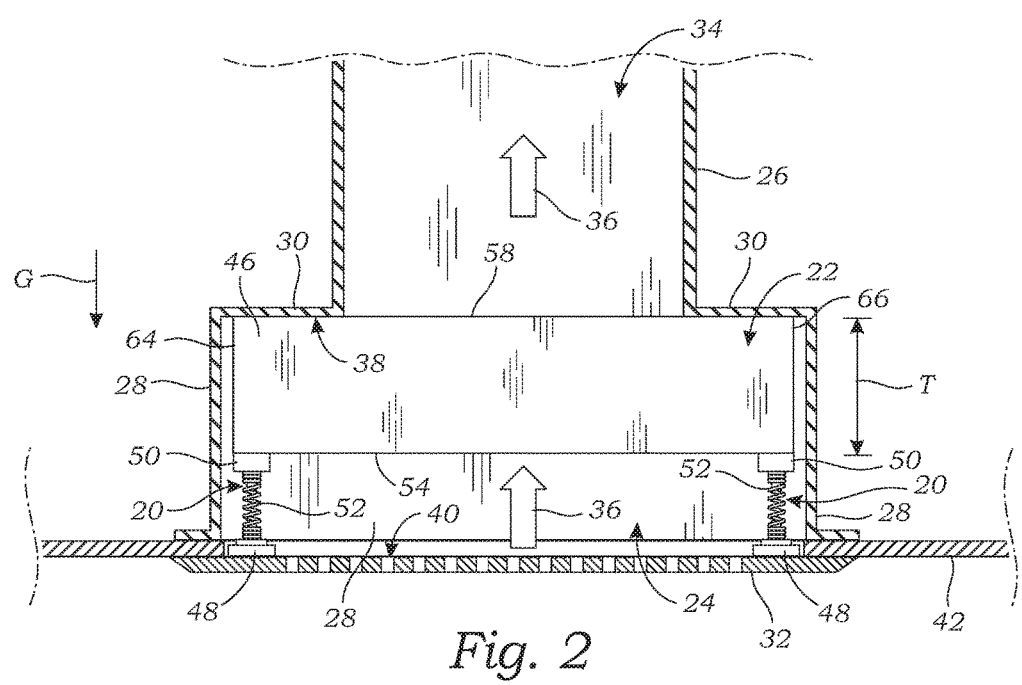
FIGS. 2-6 are simplified schematic views of a plurality of the exemplary apparatus as positioned within exemplary HVAC air ducts, in accordance with at least one embodiment.
Figure 3:
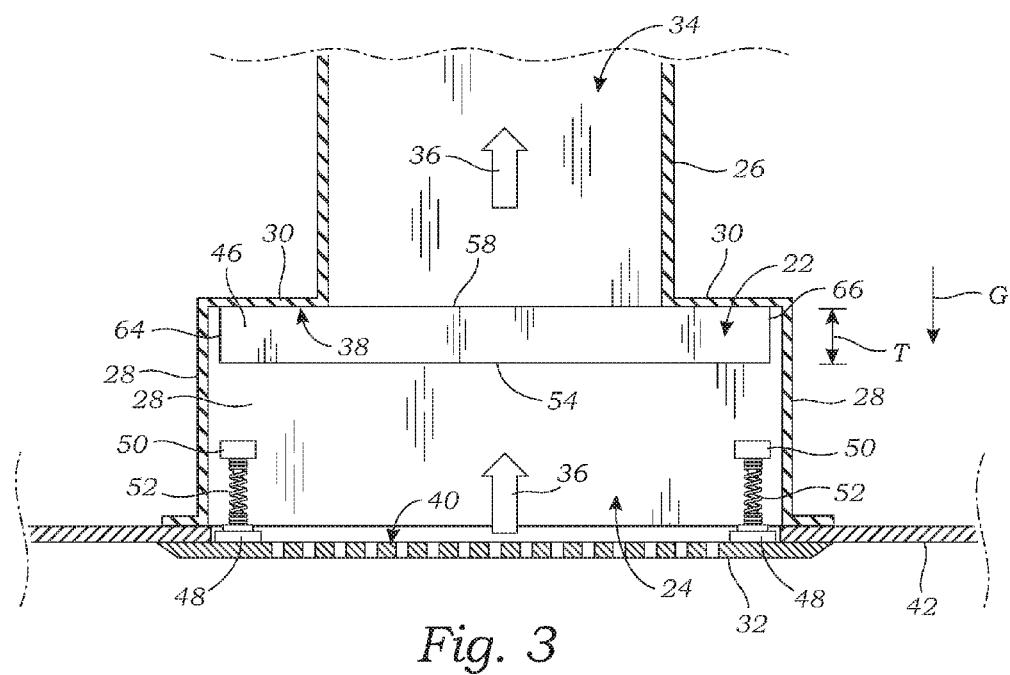
Figure 4:
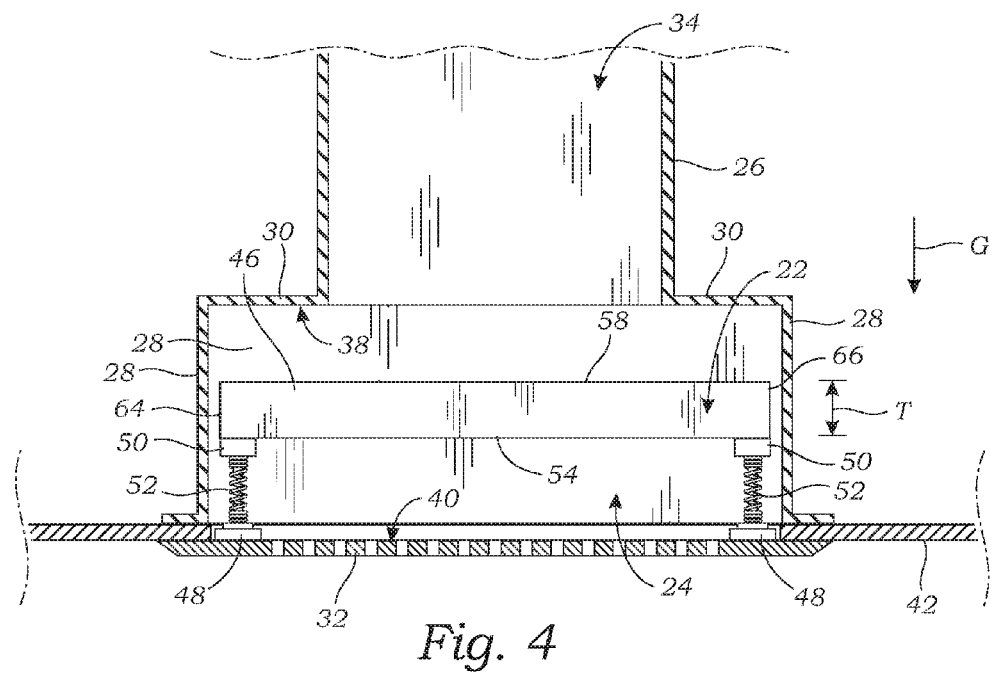

With continued reference to FIG. 1, in at least one embodiment, the at least one selectively compressible spring member 52 extends between and interconnects the base portion 48 and the support portion 50, thereby allowing a distance between the support portion 50 and base portion 48 to vary which, in turn, allows air filters 22 of various dimensions to be positioned within the cavity 24 in combination with the apparatus 20. In other words, in at least one such embodiment, the at least one spring member 52 enables the apparatus 20 to provide a "one size fits all" design. In a bit more detail, with the base portion 48 engaged with the lower end 40 of the cavity 24, the air filter 22 is positionable within the cavity 24, above the apparatus 20, such that the lower face 54 of the air filter 22 is in contact with the support portion 50. In at least one embodiment, as illustrated in FIG. 2, the at least one compressible spring member 52 has a maximum height H1—i.e., when the spring member 52 is not compressed—sufficient for causing an opposing upper face 58 of the air filter 22 to remain in contact with the upper end 38 of the cavity 24, while the lower face 54 of the air filter 22 remains in contact with the support portion 50 of the apparatus 20. In other words, in at least one embodiment, the at least one spring member 52 has a maximum height H1 sufficient for substantially maintaining the air filter 22 in a position sandwiched between the upper end 38 of the cavity 24 and the support portion 50, regardless of a thickness T of the air filter 22. Furthermore, in at least one embodiment, where the thickness T of the air filter 22 is relatively thin, such that the at least one spring member 52 is unable to keep the air filter 22 sandwiched between the upper end 38 of the cavity 24 and the support portion 50 (FIGS. 3-5), the relative positioning of the apparatus 20 within the cavity 24, and the resilient nature of the spring member 52, allow the support portion 50 to "catch" the air filter 22 and prevent the air filter 22 from impacting the lower end 40 of the cavity 24 between each cooling/heating cycle of the associated HVAC system, as discussed further below.

Additionally, given the particular material (or materials) of which the support portion 50 is constructed in at least one embodiment (as discussed above), any such impact between the air filter 22 and the support portion 50 would result in little to no noise being generated. It should be noted that the particular number and arrangement of the at least one spring member 52 shown in the drawings—along with the respective size, shape and dimensions of each of the at least one spring member 52—is merely exemplary. As such, in further embodiments, the size, shape, dimensions, number and arrangement of the at least one spring member 52 may vary, so long as the apparatus 20 is substantially capable of carrying out the functionality described herein. Similarly, in further embodiments, the at least one spring member 52 may incorporate any other type of selectively compressible structure, mechanism or combinations thereof—now known or later developed—so long as the apparatus 20 is substantially capable of carrying out the functionality described herein.

In at least one embodiment, the particular size, shape and dimensions of each of the base portion 48, support portion 50 and at least one spring member 52 are dictated, at least in part, by the respective size, shape, and dimensions of each of the cavity 24 and the air filter 22 to be positioned within the cavity 24. Thus, again, the particular size, shape and dimensions of each of the base portion 48, support portion 50 and at least one spring member 52, as illustrated in the accompanying drawings, are merely exemplary and intended to be viewed as select non-limiting examples of the apparatus 20 in order to facilitate a more complete understanding of representative embodiments now contemplated. These examples are intended to be a mere subset of all possible contexts in which the apparatus 20 may be utilized. Thus, these examples should not be construed to limit any of the embodiments described in the present specification. By way of one such example, in at least one embodiment, the apparatus 20 has a total height H2 of approximately 1.25 inches, with the at least one spring member 52 having a height H1 of approximately 0.75 inches, the base portion 48 having a width W1 of approximately 0.75 inches, and the support portion 50 having a width W2 of approximately 0.625 inches. In at least one alternate embodiment, the at least one spring member 52 may be omitted altogether, such that the support portion 50 is directly connected—either rigidly or resiliently—to the base portion 48. In at least one further alternate embodiment, the support portion 50 may be omitted altogether, such that a terminal end 62 of the at least one spring member 52 is configured for selectively contacting the lower face 54 of the air filter 22.

During use of the apparatus 20 in at least one embodiment, as illustrated in FIGS. 2-6, at least one of the apparatus 20 is positioned within the cavity 24, such that the base portion 48 is removably engaged with the lower end 40 of the cavity 24—i.e., the air vent 32 (FIGS. 2-4 and 6) or the base wall 30 (FIG. 5), depending on the orientation of the cavity 24. With the at least one of the apparatus 20 so positioned, the air filter 22 is inserted into the cavity 24 such that the lower face 54 of the air filter 22 is in contact with the support portion 50. Depending on the thickness T of the air filter 22, the upper face 58 of the air filter 22 may contact the upper end 38 of the cavity 24—i.e., the base wall 30 (FIGS. 2-4 and 6) or the air vent 32 (FIG. 5), again, depending on the orientation of the cavity 24—such that the air filter 22 is sandwiched between the upper end 38 of the cavity 24 and the support portion 50 (FIG. 2). In such an embodiment, the air filter 22 is substantially held in place as air 36 moves through the cavity 24. Otherwise, if the thickness T of the air filter 22 does not allow the air filter 22 to be sandwiched between the upper end 38 of the cavity 24 and the support portion 50, the air 36 moving through the cavity 24 could cause the air filter 22 to elevate toward the upper end 38 of the cavity 24 (FIGS. 3 and 5); such that when the flow of air 36 ceases, gravity G causes the air filter 22 to drop back down (FIG. 4), impacting the support portion 50 of the at least one apparatus 20 rather than the lower end 40 of the cavity 24, thereby preventing or at least dampening any impact noise. In at least one embodiment, as illustrated in FIGS. 2-5, a pair of apparatuses 20 are positioned within the cavity 24 such that the corresponding support portions 50 of the apparatuses 20 contact the lower face 54 of the air filter 22 proximal opposing filter ends 64 and 66 of the air filter 22. In at least one further embodiment, where the thickness T of the air filter 22 does not allow the air filter 22 to be sandwiched between the upper end 38 of the cavity 24 and the support portion 50, a first pair of apparatuses 20 are engaged with the upper end 38 of the cavity 24 and a second pair of apparatuses 20 are engaged with the lower end 40 of the cavity 24, such that the corresponding support portions 50 of the first pair of apparatuses 20 contact the upper face 58 of the air filter 22 and the corresponding support portions 50 of the second pair of apparatuses 20 contact the lower face 54 of the air filter 22—i.e., the air filter 22 is sandwiched between the support portions 50 of the first and second pairs of apparatuses 20. In still further embodiments, any number of apparatuses 20 may be selectively arranged and positioned within the cavity 24, dependent at least in part on the respective size, shape, and dimensions of each of the cavity 24 and the air filter 22 to be positioned within the cavity 24.

In closing, regarding the exemplary embodiments of the present invention as shown and described herein, it will be appreciated that a sound dampening apparatus and associated methods of use for dampening or otherwise preventing impact noises between an HVAC air filter and the air duct cavity in which the air filter is positioned are disclosed. Because the principles of the invention may be practiced in a number of configurations beyond those shown and described, it is to be understood that the invention is not in any way limited by the exemplary embodiments, but is generally directed to a sound dampening apparatus for HVAC air filters and is able to take numerous forms to do so without departing from the spirit and scope of the invention.

It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A sound dampening apparatus for dampening or otherwise preventing impact noises between an HVAC air filter and a cavity of an air duct in which the air filter is positioned, the cavity defined by perimeter side walls extending between a base wall and an opposing air vent, the apparatus comprising:
    a base portion engagable with a lower end of the cavity;
    an opposing support portion configured for selectively contacting a lower face of the air filter and supporting the air filter thereon, the support portion being constructed out of a resilient material capable of softening any impacts, or otherwise dampening the noise created by any impacts, received from the air filter; and
    an at least one selectively compressible spring member extending between and interconnecting the base portion and the support portion, the at least one spring member being sandwiched between the base portion and the opposing support portion;
    whereby, with the air filter positioned between the support portion and an upper end of the cavity, and air flowing through the cavity in a substantially upward direction, the support portion prevents the air filter from impacting the lower end of the cavity upon cessation of said air flow, thereby dampening or otherwise preventing the air filter from creating any impact noises.

2. The sound dampening apparatus of claim 1, wherein the base portion is removably engagable with the lower end of the cavity.

3. The sound dampening apparatus of claim 2, wherein the base portion is magnetic.

4. The sound dampening apparatus of claim 1, wherein the support portion is constructed out of a material selected from one of plastic, rubber, silicone and foam.

5. The sound dampening apparatus of claim 1, wherein a top surface of the support portion provides a pad positioned and configured for selectively contacting the lower face of the air filter and supporting the air filter thereon, the pad constructed out of a material capable of softening any impacts, or otherwise dampening the noise created by any impacts, received from the air filter.

6. The sound dampening apparatus of claim 1, wherein the at least one spring member is a spring.

7. The sound dampening apparatus of claim 1, wherein the at least one spring member has a maximum height sufficient for causing the air filter to be sandwiched between the upper end of the cavity and the support portion, regardless of a thickness of the air filter.

8. The sound dampening apparatus of claim 1, wherein the apparatus has a total height of approximately 1.25 inches, with the at least one spring member having a height of approximately 0.75 inches, the base portion having a width of approximately 0.75 inches, and the support portion having a width of approximately 0.625 inches.

9. A sound dampening apparatus for dampening or otherwise preventing impact noises between an HVAC air filter and a cavity of an air duct in which the air filter is positioned, the cavity defined by perimeter side walls extending between a base wall and an opposing air vent, the apparatus comprising:
   a magnetic base portion engagable with a lower end of the cavity;
   an opposing support portion configured for selectively contacting a lower face of the air filter and supporting the air filter thereon, the support portion being constructed out of a resilient material capable of softening any impacts, or otherwise dampening the noise created by any impacts, received from the air filter; and
   an at least one selectively compressible spring member extending between and interconnecting the base portion and the support portion, the at least one spring member being sandwiched between the base portion and the opposing support portion;
   whereby, with the air filter positioned between the support portion and an upper end of the cavity, and air flowing through the cavity in a substantially upward direction, the support portion prevents the air filter from impacting the lower end of the cavity upon cessation of said air flow, thereby dampening or otherwise preventing the air filter from creating any impact noises.

10. A method for dampening or otherwise preventing impact noises between an HVAC air filter and a cavity of an air duct in which the air filter is positioned, the cavity defined by perimeter side walls extending between a base wall and an opposing air vent, the method comprising the steps of:
   positioning an at least one sound dampening apparatus within the cavity, the at least one sound dampening apparatus providing a base portion and an opposing support portion interconnected by an at least one selectively compressible spring member sandwiched between the base portion and the opposing support portion, the support portion being constructed out of a resilient material capable of softening any impacts, or otherwise dampening the noise created by any impacts, received from the air filter;
   engaging the base portion of the at least one apparatus with a lower end of the cavity; and
   positioning the air filter between the support portion of the at least one apparatus and an upper end of the cavity, such that a lower face of the air filter is in contact with the support portion of the at least one apparatus;
   whereby, as air flows through the cavity in a substantially upward direction, the support portion prevents the air filter from impacting the lower end of the cavity upon cessation of said air flow, thereby dampening or otherwise preventing the air filter from creating any impact noises.

11. The method of claim 10, wherein the step of engaging the base portion of the at least one apparatus with the lower end of the cavity further comprises the step of removably engaging the base portion of the at least one apparatus with the lower end of the cavity.

12. The method of claim 10, further comprising the step of positioning the air filter between the support portion of the at least one apparatus and the upper end of the cavity, such that the lower face of the air filter is in contact with the support portion of the at least one apparatus and an opposing upper face of the air filter is in contact with the upper end of the cavity.

13. The method of claim 10, wherein the step of positioning at least one sound dampening apparatus within the cavity further comprises the step of positioning a pair of sound dampening apparatuses such that the corresponding support portions of the apparatuses contact the lower face of the air filter proximal opposing filter ends of the air filter.

14. The method of claim 10, wherein the step of positioning at least one sound dampening apparatus within the cavity further comprises the steps of:
   positioning a first pair of sound dampening apparatuses within the cavity;
   engaging the base portion of each of the first pair of apparatuses with a lower end of the cavity;
   positioning a second pair of sound dampening apparatuses within the cavity;
   engaging the base portion of each of the second pair of apparatuses with an upper end of the cavity; and
   positioning the air filter between the first and second pairs of apparatuses, such that the air filter is sandwiched between the support portions of the first pair of apparatuses and the support portions of the second pair of apparatuses.

* * * * *